Oct. 23, 1951        D. I. WEISZ ET AL        2,572,548
BRAKE STRUCTURE FOR PLATFORM TYPE CASTERS OR THE LIKE
Filed May 16, 1949
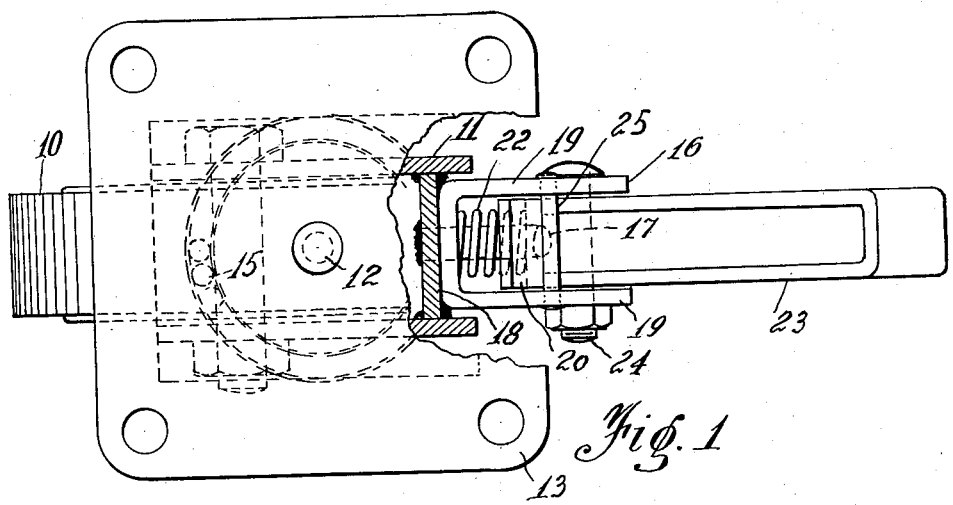
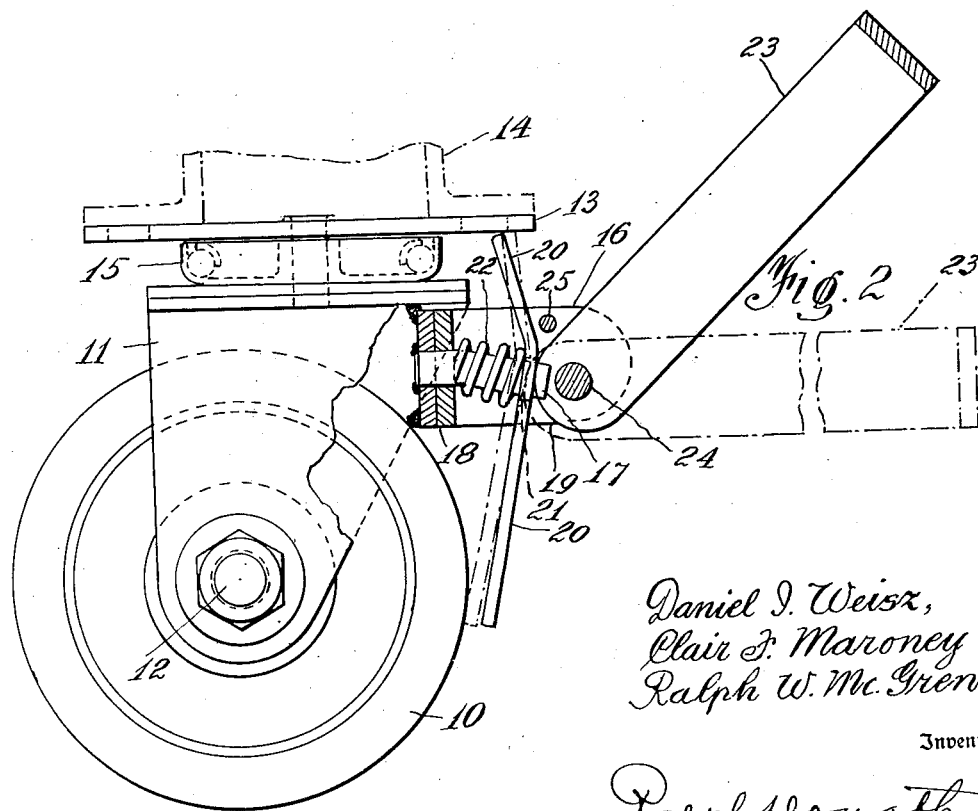
Daniel I. Weisz,
Clair F. Maroney and
Ralph W. McGrew
Inventors
By Ralph Leonath
Attorney Patented Oct. 23, 1951

2,572,548

UNITED STATES PATENT OFFICE 2,572,548

BRAKE STRUCTURE FOR PLATFORM TYPE CASTERS OR THE LIKE

Daniel I. Weisz, Clair F. Maroney, and Ralph W. McGrew, Ellwood City, Pa.

Application May 16, 1949, Serial No. 93,602

4 Claims. (Cl. 16—35)

This invention relates to a brake structure and more particularly to a brake for platform type casters or the like having a caster wheel and bracket pivotally mounted on a swivel plate. Casters of this type are frequently used on portable scaffolding, heavy industrial trucks, engine mounts and other portable structures. It is often desirable that equipment of this type be held in a fixed or predetermined position which will not change while men are at work on or near the structure.

We have invented a brake structure which is particularly adapted to use on such equipment. The brake of our invention is adapted, when set, to prevent both the caster wheel from rolling and the caster wheel and bracket from swiveling. The structure is such that the wheel can neither swivel nor roll even though considerable force be exerted against it.

Our invention comprises generally a brake shoe resiliently mounted on the caster bracket and adapted when flexed to engage frictionally both the outer periphery of the caster wheel and the surface of the surface plate, and means for flexing said brake shoe.

In the accompanying drawings illustrating a preferred embodiment of the invention, Figure 1 is a top plan view of a platform type caster, partly cut away, showing the brake of our invention.

Figure 2 is a side elevation of the caster of Figure 1, partly cut away.

Referring to the drawings, there is shown a caster wheel 10 mounted within a wheel bracket 11. The wheel bracket 11 is pivotally mounted on a pin 12 passing into a swivel plate 13 which is adapted to be fastened to the foot of the scaffolding 14 or other structure to which the caster is applied. A ball bearing 15 or other like anti-friction device lies between the wheel bracket 11 and the swivel plate 13 so as to permit ease of movement about the pin 12.

A brake support member 16 is welded or otherwise fastened within the wheel bracket 11. A guide pin 17 is fastened to the base 18 of the brake support member and extends outwardly and downwardly therefrom between the sides 19 of the support member. An angular brake shoe 20 having an opening 21 adapted to fit slidably over the guide pin 17 is mounted on the pin within the brake support member. A compression spring 22 surrounds the guide pin 17 and butts against both the brake shoe 20 and the brake support member base 18 and tends to hold the brake shoe in the disengaged position. Treadle cam member 23 is pivotally mounted on a pin 24 between the sides of the brake support member 19 and is adapted when stepped upon to cause the brake shoe to shift and flex and contact the wheel and swivel plate. A stop pin 25 passing between the sides 19 of the brake support member 16 adjacent the end of the guide pin 17 acts as a limit stop to prevent the brake shoe from leaving the guide pin when the shoe is in disengage position.

To operate the brake structure of the invention it is merely necessary to step upon or otherwise force the treadle cam member 23 downwardly. The eccentric end of the cam then engages the brake shoe 20 and forces it inwardly against the force of the spring 22 tending to hold the brake shoe in the disengaged position. The combined forces of the spring and the cam member causes the brake shoe to shift and flex as shown in dot and dash lines in Figure 2 and to press against the wheel 10 and the swivel plate 13 in frictional engagement, thereby holding the wheel against rotation about its axis and the wheel and bracket from rotating about the pin 12 in the swivel plate.

It is readily apparent that the brake structure of the invention is simple in both construction and operation, efficient and cheap to manufacture. A caster to which it is applied cannot roll or swivel and furnishes a safe and solid yet simple foundation for portable structures.

Although we have illustrated and described a present preferred embodiment of our invention, it is to be understood that it may be otherwise embodied within the scope of the following claims.

We claim:

1. A brake structure for platform type casters or the like having a caster wheel and bracket pivotally mounted on a swivel plate comprising a brake support member adapted to be mounted on the bracket, an outwardly and downwardly extending guide pin centrally of said support member, a brake shoe slidably mounted on said guide pin adapted when shifted to engage frictionally both the caster wheel and the under surface of the swivel plate, resilient means surrounding the guide pin and cooperating with the support member in tending to hold the brake shoe in the disengaged position, and means for shifting said brake shoe.

2. A brake structure for platform type casters or the like having a caster wheel and bracket pivotally mounted on a swivel plate comprising a substantially U-shaped brake support member adapted to be mounted on the bracket, a downwardly and outwardly extending guide pin in said support member, a brake shoe slidably mounted on said guide pin and adapted when shifted to engage frictionally both caster wheel and the under surface of the swivel plate, resilient means surrounding the guide pin and cooperating with the support member in tending to hold the brake shoe in the disengaged position and cam means pivotally mounted in the support member adjacent said brake shoe and adapted to pass on either side of the guide pin for shifting the brake shoe.

3. A brake structure for platform type casters or the like having a caster wheel and bracket pivotally mounted on a swivel plate comprising a substantially U-shaped brake support member adapted to be mounted on the bracket, a downwardly and outwardly extending guide pin in said support member, a brake shoe slidably mounted on said guide pin and adapted when shifted to engage frictionally both the caster wheel and the under surface of the plate, a compression spring surrounding the guide pin and tending to hold the brake shoe in the disengaged position, and treadle cam means pivotally mounted in the support member adjacent said brake shoe and adapted when stepped upon to shift the brake shoe.

4. A brake structure for platform type casters or the like having a caster wheel and bracket pivotally mounted on a swivel plate comprising a substantially U-shaped brake support member adapted to be mounted on the bracket, a downwardly and outwardly extending guide pin having one end mounted in said support member, a brake shoe slidably mounted on said guide pin and adapted when shifted to engage frictionally both the caster wheel and the under side of the swivel plate, stop means in the support member adjacent the free end of the guide pin and adapted to limit the movement of the brake shoe on the guide pin, resilient means surrounding the guide pin and cooperating with the support member in tending to hold the brake shoe in the disengaged position, and cam means pivotally mounted in the support member adjacent the brake shoe for shifting said shoe.

DANIEL I. WEISZ.
C. F. MARONEY.
RALPH W. McGREW.

REFERENCES CITED

The following references are of record in the file of this patent:

UNITED STATES PATENTS

| Number | Name | Date |
|---|---|---|
| 1,633,638 | Jarvis et al. | June 28, 1927 |
| 2,111,561 | Herold | Mar. 22, 1938 |
| 2,262,433 | Uecker et al. | Nov. 11, 1941 |
| 2,345,442 | Winter et al. | Mar. 28, 1944 |